(12) United States Patent
Keene et al.

(10) Patent No.: US 7,969,991 B2
(45) Date of Patent: Jun. 28, 2011

(54) SESSION ANNOUNCEMENT SYSTEM AND METHOD

(75) Inventors: Michael Donovan Keene, Coral Springs, FL (US); Stevan Markovic, Boynton Beach, FL (US); Donnie B. Law, Plantation, FL (US)

(73) Assignee: McAfee, Inc., Santa Clara, CA (US)

( * ) Notice: Subject to any disclaimer, the term of this patent is extended or adjusted under 35 U.S.C. 154(b) by 219 days.

(21) Appl. No.: 11/738,709

(22) Filed: Apr. 23, 2007

(65) Prior Publication Data

US 2008/0259938 A1    Oct. 23, 2008

(51) Int. Cl.
*H04L 12/28* (2006.01)

(52) U.S. Cl. ............... 370/400; 370/395.2; 370/392

(58) Field of Classification Search ........... 719/328, 719/4; 709/223, 236, 219, 201, 203, 227; 370/395.32, 392, 401, 428
See application file for complete search history.

(56) References Cited

U.S. PATENT DOCUMENTS

| | | | |
|---|---|---|---|
| 6,097,882 A * | 8/2000 | Mogul | 709/201 |
| 6,195,680 B1 * | 2/2001 | Goldszmidt et al. | 709/203 |
| 6,748,437 B1 * | 6/2004 | Mankude et al. | 709/227 |
| 6,779,039 B1 * | 8/2004 | Bommareddy et al. | 709/238 |
| 7,280,540 B2 * | 10/2007 | Halme et al. | 370/392 |
| 7,328,237 B1 * | 2/2008 | Thubert et al. | 709/203 |
| 7,443,787 B2 * | 10/2008 | Karino et al. | 370/218 |
| 7,567,504 B2 * | 7/2009 | Darling et al. | 370/216 |
| 7,738,452 B1 * | 6/2010 | O'Rourke et al. | 370/389 |
| 7,751,327 B2 * | 7/2010 | Karino et al. | 370/235 |
| 7,813,276 B2 * | 10/2010 | Gilfix | 370/230 |
| 2003/0018927 A1 * | 1/2003 | Gadir et al. | 714/4 |
| 2006/0080446 A1 * | 4/2006 | Bahl | 709/227 |
| 2007/0121490 A1 * | 5/2007 | Iwakawa et al. | 370/218 |
| 2008/0222267 A1 * | 9/2008 | Horn | 709/217 |
| 2008/0259797 A1 * | 10/2008 | Gruper et al. | 370/235 |

* cited by examiner

*Primary Examiner* — Michael J Moore, Jr.
(74) *Attorney, Agent, or Firm* — Schwegman, Lundberg & Woessner, P.A.

(57) ABSTRACT

A cluster system and method. The cluster includes a first and a second interface and two or more nodes, wherein each node is connected to the first and second interfaces, wherein exactly one node includes a first redirector and wherein exactly one node includes a second redirector. The first and second redirectors include means for establishing and tracking sessions and means for forwarding packets to the chosen node. The chosen node receives a packet from the first redirector and uses the packet to send a Session Announcement to the second redirector.

14 Claims, 4 Drawing Sheets

| PACKET TYPES (DIRECTIONS) | LOAD DIRECTOR (REDIRECTOR) | | LOAD DIRECTOR (NOT REDIRECTOR) | |
|---|---|---|---|---|
| | NO SESSION [1] | SESSION EXISTS [2] | NO SESSION [3] | SESSION EXISTS [4] |
| INBOUND (NOT FROM ANOTHER CLUSTER NODE) [1] | 1) LOOKUP RULE 2) CREATE SESSION – REDIRECTION SESSION 3) REDIRECT TO RESPONSIBLE NODE. | 1) REDIRECT TO RESPONSIBLE NODE. | 1) CREATE SESSION FOR THIS NODE (PREVENTS OUTBOUND FROM BEING REDIRECTED AS A SESSION ANNOUNCEMENT) – MARKER SESSION 2) PASS UP THE STACK | 1) PASS UP THE NETWORK STACK |
| INBOUND (FROM ANOTHER NODE, AND THEREFORE A SESSION ANNOUNCEMENT PACKET) [2] | 1) CREATE SESSION BASED ON PACKET'S SOURCE NODE – REDIRECTION SESSION 2) ROUTE TO DESTINATION | 1) ROUTE TO DESTINATION (THIS CASE ISN'T EXPECTED UNLESS PACKETS ARE LOST) | NA (SESSION ANNOUNCEMENTS ARE ONLY SENT TO REDIRECTORS) | NA (SESSION ANNOUNCEMENTS ARE ONLY SENT TO REDIRECTORS) |
| OUTBOUND [3] | 1) CREATE SESSION FOR THIS NODE. 2) ROUTE TO DESTINATION | 1) ROUTE TO DESTINATION | 1) SEND TO THE REDIRECTOR TO ANNOUNCE THE SESSION. 2) DON'T CREATE A SESSION TO ALLOW FOR THE ANNOUNCEMENT BEING LOST). | 1) ROUTE TO DESTINATION. |

Fig. 3

SESSION ANNOUNCEMENT SYSTEM AND METHOD

BACKGROUND OF THE INVENTION

1. Field of the Invention

The present invention is related to computer network systems, and more particularly, to a system and method for establishing and maintaining network connections on clustered systems.

2. Background Information

High Availability (HA) clusters are designed to maximize availability of network services. They consist of a cluster of computer systems, each of which is called a node, in which various network streams such as a Transfer Control Protocol (TCP) connection are assigned to different nodes when one or more nodes in the cluster are not functional, or to share the network load across multiple nodes.

Early HA clusters operated in an Active/Standby mode, in which only one node was active at any given time, and network state and traffic would be redirected to the functioning node in case of a failure on one node. HA clusters are now more complex and capable of supporting multiple active nodes with load sharing across multiple nodes. In one embodiment, the cluster nodes are Stateful Inspection firewalls. Each node in a Stateful Inspection firewall cluster must maintain status on the network streams (such as a TCP connection) assigned to it for the life of the stream. This requires that once a stream is assigned to a node in the cluster, it must remain on that node for its duration.

What is needed is a system and method for directing a network stream to a node in the cluster and for ensuring that the same network stream assigned to an active node remains on that node as it traverses the network through the cluster.

BRIEF DESCRIPTION OF THE DRAWINGS

FIG. 3 illustrates the handling of a packet by redirecting and non-redirecting load directors based on the direction of a packet and the results of a session lookup.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
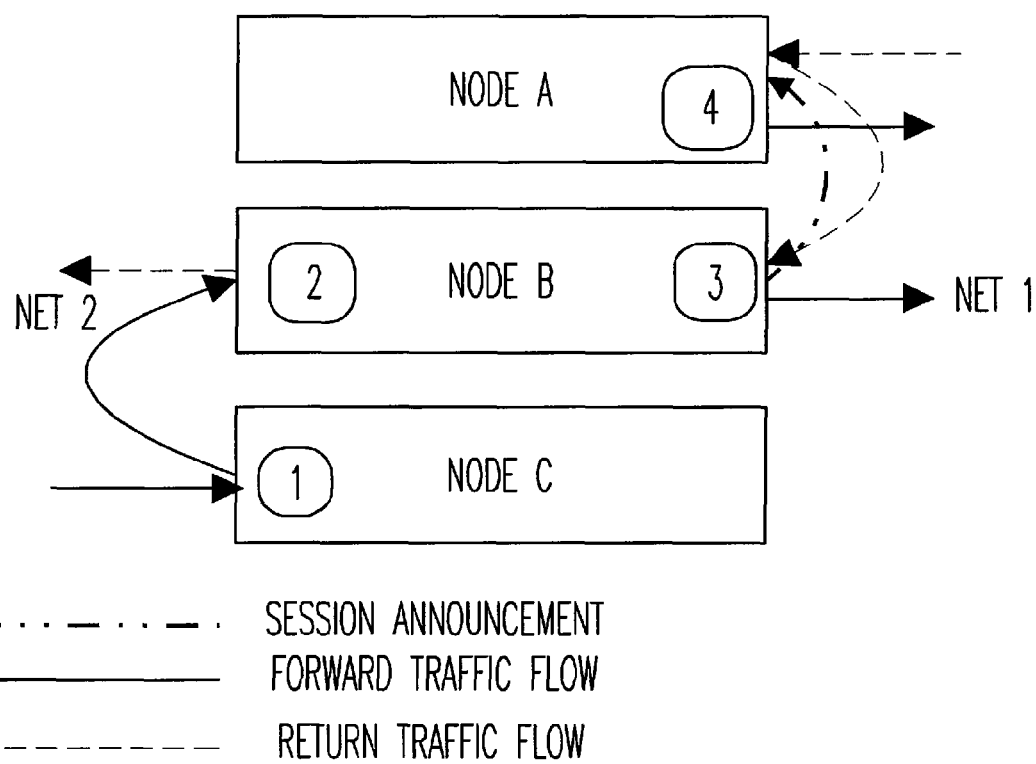
FIG. 1 illustrates load director sessions created in a cluster, including the session created by a Session Announcement.

A three node cluster is shown in FIG. 1. The cluster includes three nodes (A, B, and C, respectively) connected to networks 1 and 2. Network entities communicate on the internal and external sides of the nodes (i.e., Servers and Clients). Communication is in the form of initiated request and response for service across the cluster often on different interfaces.

Figure 2:
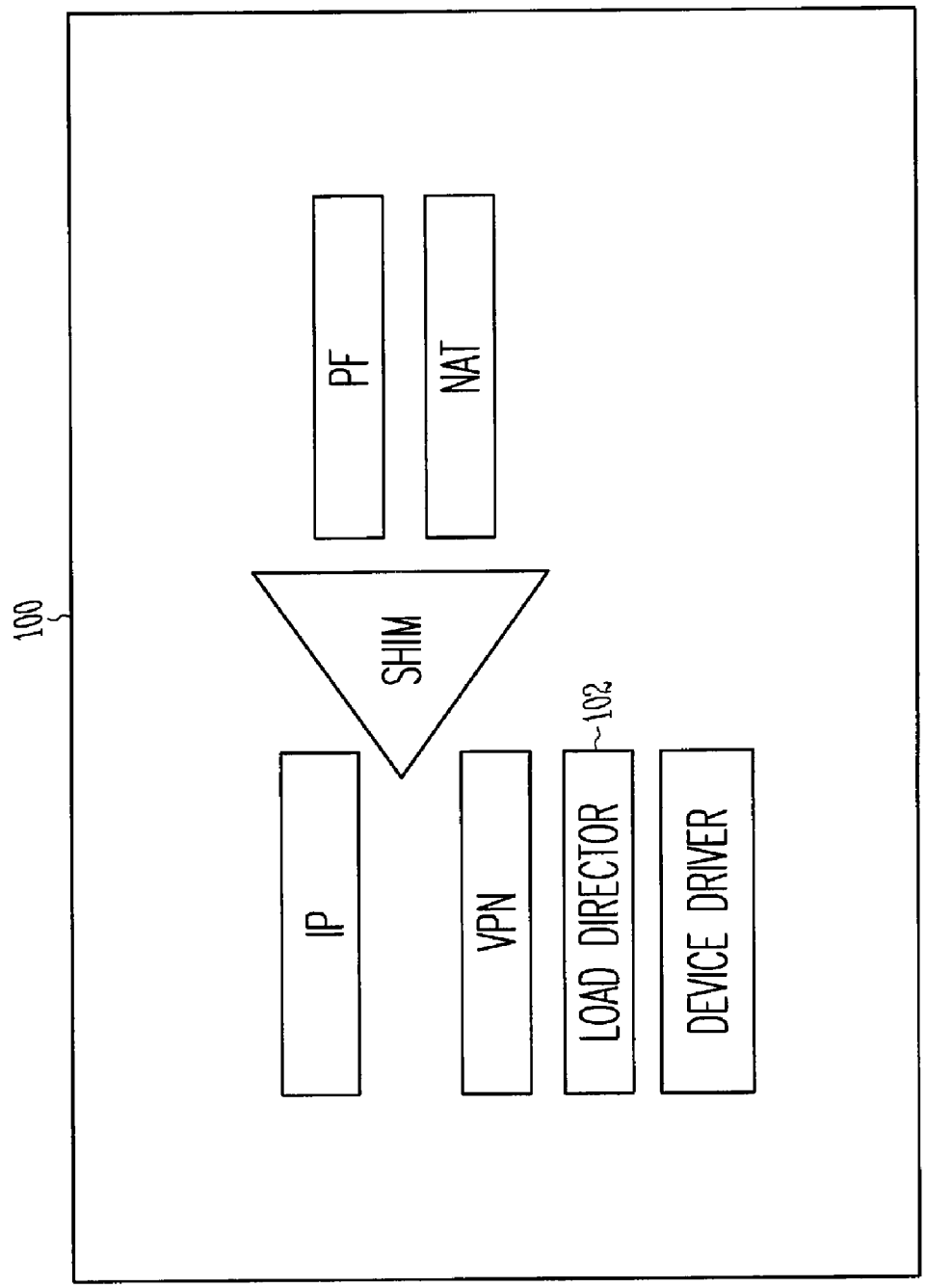
FIG. 2 illustrates a load director module in a firewall's networking stack.

In one embodiment, where the cluster is composed of firewalls as the network servers, most of the clustering functionality is located in a load director module 102 that is at the bottom of the firewall's networking stack 100 as shown in FIG. 2. The load director's function is to send inbound traffic to the appropriate node.

In general, the nodes in the cluster handle traffic in units of streams, which are related sets of packets (associated by the five-tuple consisting of the source address, destination address, protocol, source port, and destination port). In one embodiment, the network server may provide a Virtual Private Network (VPN). A VPN additionally aggregates streams of traffic into the same tunnel, which share a security association (SA).

The load director makes use of the network server's stream-based approach to send each stream to exactly one node in the cluster. In the case of VPN, in one embodiment, the load director has rules that govern session creation and associate the related streams (those that will be tunneled) to the same node.

To ensure that the same stream always goes to the same node, the load director tracks the active streams with load director sessions. Load director sessions are either uni-directional or bi-directional and are created when the load director sees the first packet in a stream, which may be inbound or outbound (relative to the node). The packet will cause the load director 102 to create a session that can be looked up by the five-tuple mentioned above, and the session identifies the cluster node assigned to process the stream. A more detailed discussion on this topic can be found below.

As previously stated, in one embodiment, the load director 102 is located at the bottom of the networking stack 100. It operates independently on each interface, but the nodes must cooperate to synchronize data per cluster interface. The cluster interface refers to the interfaces serving the same physical network across the nodes. This arrangement enables placing a single load director "in front" of each cluster interface. This can be done in software or in hardware.

Each interface on a node has a unique IP address assigned to it referred to as the personal IP address. This address is different than the cluster's virtual IP address that is shared across corresponding interfaces in the cluster.

In one embodiment, the load director module is very much like a simple packet filter. The load director contains sessions, rules, and a special default rule. The result of a rule/session lookup is to answer the question "which node is responsible for this traffic?" When that question is answered, the load director will redirect the packet to the appropriate node (unless the current node is the appropriate node, in which case it is simply passed up the IP stack.). In addition to the normal session/rule lookups, the load director must take care to handle IP fragments correctly, ICMP packets must be specially handled, and Address Resolution Protocol (ARP) must be filtered.

ARP filtering will be discussed next.

All of the traffic routed to a particular cluster interface will arrive at one node in the cluster. That node is known as the redirector, and it has the responsibility of deciding to which node within the cluster to send the traffic and then sending it.

In one embodiment, to force all of the incoming traffic to the redirector node, ARP and neighbor discovery (in IPv6) is tightly controlled. ARP and neighbor discovery associate a link layer (OSI level 2) Media Access Control (MAC) address with a level 3 IP address. When a router realizes that the packet it must forward belongs on the local network segment, it issues an ARP or neighbor discovery request for the next-hop router, which in this case is the cluster. The request is broadcast to all hosts on the local network segment and contains the IP address in question. When the host with the matching address sees the request, it composes and sends a reply. The ARP or neighbor discovery reply simply associates the IP address in question with the matching host's MAC address.

In one embodiment, outbound ARP and neighbor discovery replies are filtered by the load director and only allowed to pass down the stack on the redirector node. As a result, network equipment outside of the cluster only sees the MAC address for the redirector node associated with the cluster virtual IP address, so all traffic that is to pass through the cluster is sent to the redirector node for that cluster interface. The exception to the filtering is that the outbound replies containing the personal IP address of the node may always be passed down the stack.

Inbound ARP or neighbor discovery replies and outbound requests are never filtered by the load director. These messages allow the node to resolve the addresses of other hosts on the local network. Inbound ARP requests need not be filtered because the outbound reply is always filtered.

Finally, notice that when the redirector node fails, it is necessary for another node to take over for it. In this case, a new node is elected as the redirector and it may gratuitously send an ARP or neighbor discovery reply to inform local network segment hosts of the change.

Load director redirection will be discussed next.

Once a packet arrives at the redirector, the load director processes it to determine which node is responsible for its handling. If the node responsible for that packet is not the redirector, the packet must be sent to the correct node. The load director does this by changing the destination MAC address (level 2) in the packet to the MAC address of the responsible node, and then sending the packet out the interface on which it arrived.

In one embodiment, the cluster has the flexibility to work either with all interfaces having only the cluster IP address, or with each interface having both a unique personal IP address as well as an alias for the cluster IP address. In such an embodiment, the MAC addresses of each node are obtained over the heartbeat LAN in order to allow all interfaces to have the same IP address.

There is one redirector per cluster interface. In one embodiment, the redirector nodes are chosen as follows: Each cluster interface can be assigned a number based on its position in a configuration file. Likewise, each node can be numbered according to its configuration file position. The algorithm for selecting the redirector may simply "round-robin" the cluster interface to the node. For example, node one is assigned to redirect for cluster interface one, node two will redirect for cluster interface two, and so on and so forth. If the number of cluster interfaces exceeds the number of nodes, the algorithm simply wraps.

On failover, the redirector must be reassigned.

In the case where a Session Announcement is needed, each node in a cluster must maintain status on the network streams (such as a TCP connection) assigned to it for the life of the stream. This requires that once a stream is assigned to a node in the cluster, it must remain on that node for its duration.

To accomplish this, for each interface in the cluster, one node of the cluster is chosen to be a redirector. All traffic arriving on each cluster interface of the cluster will come to the associated redirector. When a new network stream arrives at the redirector, it chooses a node that will handle that stream. The node choice decision must be made persistent for the life of the network stream by means of a redirector session. In one such embodiment, a redirector session is an in-memory record of the characteristics of the network session, including the five-tuple and the node chosen for that session.

For this discussion, we will define the client side of the cluster as the side of the cluster where the network stream originates, called the External network, and the server side of the cluster as the side to where the initial packet of the network stream is destined, called the Internal network. When a packet for a new network session arrives on the client side of the cluster, the redirector on the client side cluster interface is immediately made aware of the network session simply by its arrival and it must choose which node will handle the session.

The problem at hand, which is solved by the Session Announcement method, is when the packet leaves the cluster node on the server side. Network traffic arrives and leaves on different interfaces on either side of the cluster. There is no guarantee that the redirector node that receives the return traffic is the same node that was chosen to process the stream. If the node chosen to process the network stream is not a redirector on the server side, then the node that is the redirector must be made aware of the network stream so that it can redirect the return traffic (from the server to the client) to the node that has been chosen to handle the network stream. In other words, we must ensure that for a given network stream, the server side redirector chooses the same node that the client side redirector chose.

A Session Announcement method is used to ensure that the server side redirector chooses the same node that the client side redirector chose. Session Announcement is a way to reliably give the redirector node on the server side the information that it needs to create a redirector session without undue overhead or complexity.

The Session Announcement method works because of the following principle: The reliability of the creation of the redirector session does not have to be perfect. It only has to be as good as the reliability of the delivery of the outgoing packet. In other words, if the outgoing packet is not delivered because of an interface error, network congestion, system load, or other temporal problem, then it is not necessary to create the redirector session.

Because of the stated principle, the Session Announcement makes use of the outgoing packet to propagate the need for a session to a redirector node by modifying the MAC address of the first packet in a network stream. The MAC address is modified to be that of the interface for the redirector node. The outgoing packet contains all the information that the redirector needs to create a session. Passing the packet through the redirector ensures that the needed redirector session will be created before the associated packet reaches its destination network. The practice of using the outgoing packet for the Session Announcement precludes the possibility that the packet could reach its final destination without first having the redirector session created.

That is, the Session Announcement uses the outgoing packet itself to give the redirector the information it needs to create the session. The Session Announcement also relies on the redirector to deliver the packet to the server network, ensuring that the creation of the redirector session is as reliable as the packet delivery.

The Session Announcement is created by modifying the destination MAC address in the outgoing packet to be that of the node that is the redirector for the outgoing cluster interface. This causes the outgoing packet to be delivered to the redirector node rather than the next hop router on the server side network. The redirector node identifies the incoming packet as a Session Announcement by observing that the source MAC address is that of another node in the cluster, namely the node that was chosen to handle the network stream. When the redirector observes the Session Announcement, it creates the needed redirector session, then uses conventional routing to place the correct destination MAC address in the packet, then sends it out on the same interface on which it arrived.

To prevent unnecessary overhead due to redundant Session Announcements, a marker session is created on non-redirector nodes. The marker session will indicate that Session Announcements are no longer needed. The non-redirector node knows that Session Announcements will no longer be needed for a network stream when it observes an inbound packet which it knows came from the redirector, and therefore the redirector must already have a session for it. In one embodiment, a marker session is created when the inbound packet is observed.

The table shown in FIG. 3 illustrates the handling of a packet by redirecting and non-redirecting load directors based on the direction of a packet and the results of a session lookup.

Returning to FIG. 1, one use of the Session Announcement is illustrated in a three node cluster. In the example shown, "NET 2" is the client network, where the network stream originates. Node C is the redirector node for NET 2. "NET 1" is the server network, where the initial packet is destined. Node A is the redirector node for "NET 1." The 1 in the circle represents the redirector session on Node C. The 2 in the circle and the 3 in the circle represent the marker sessions on Node B. The 4 in the circle represents the redirector session on Node A.

The issue is how to create redirector session 4. When the initial packet leaves Node B for NET 1, it is changed to a Session Announcement (shown by the dotted and dashed line) such that it travels to Node A rather than directly out to NET 1. This allows Node A to reliably create a redirector session (redirector session 4 in FIG. 1), which will guarantee that the return traffic (shown in dashed lines) will be sent to Node B. After Node A has created the session, it forwards the initial packet (shown by solid lines) on to its destination on NET 1.

We will now look at a more detailed example of a Session Announcement.

Figure 4:
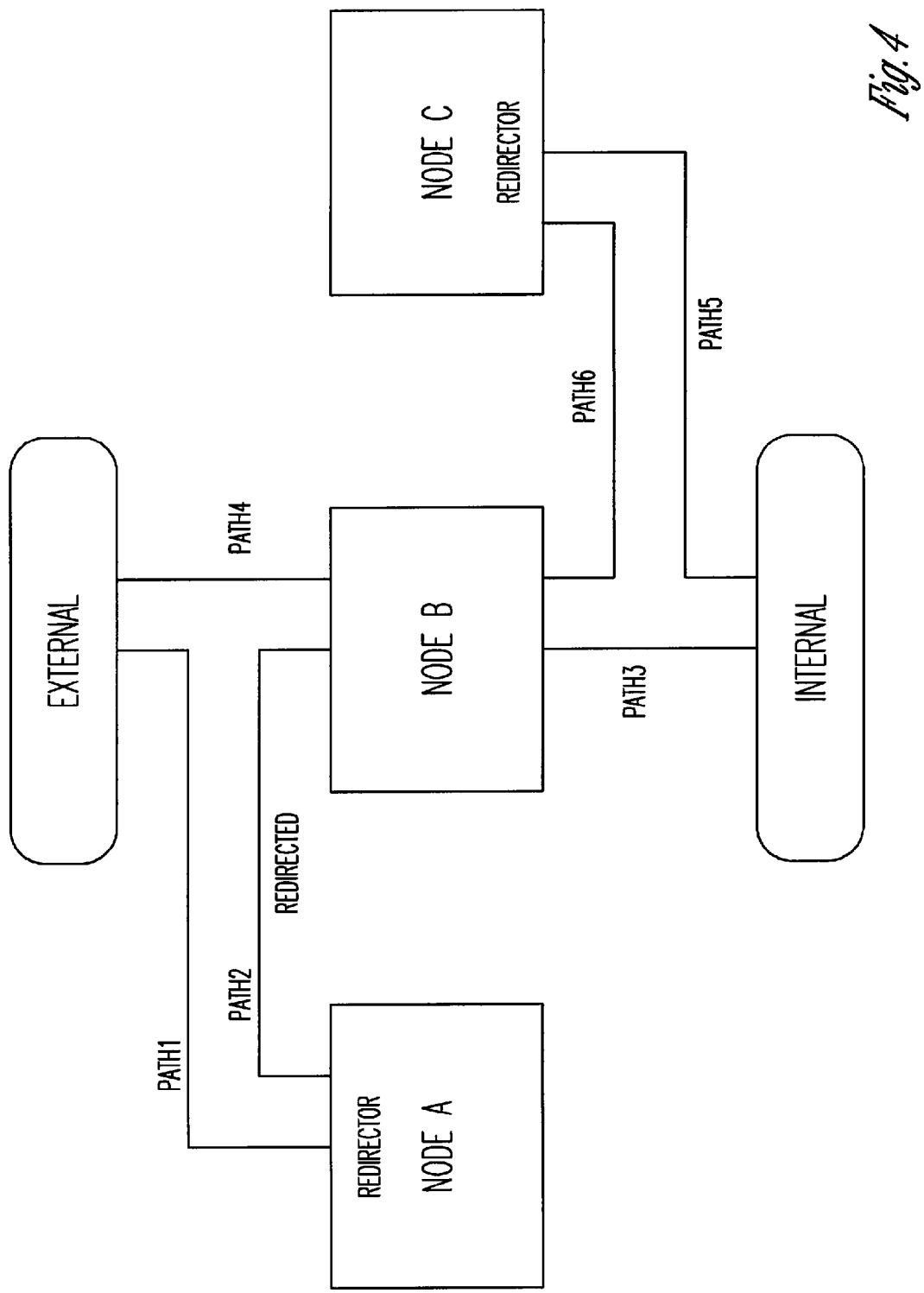
FIG. 4 illustrates a redirection scenario that makes use of a Session Announcement.

In the four session case shown in FIG. 4, Node B is the node that will handle the traffic, but it has no redirectors on the relevant interfaces. Node A is the Redirector for the external side, and Node C is the redirector for the internal side.

A new session is initiated by traffic arriving at Node A via path1. It has no matching session, so it chooses Node B and creates a new redirector session. It then redirects the packet to Node B via path2.

The Load Director on the External side of Node B sees the incoming traffic. It observes that it does not have a session for this traffic so it creates a marker session for the traffic. The traffic passes on up into the node to be processed and sent out the Internal side of Node B.

When the traffic reaches the Internal side of Node B, the load director for the Internal interface does not have a session for it, and is not the redirector. Therefore, the Redirector for the Internal interface must be told about this session so that return traffic (coming from Internal to External) will return to Node B.

We want to inform the Redirector in a reliable way— specifically, just as reliable as the packet itself. We do so by using the packet itself to notify the Redirector. Rather than letting the (first) packet pass directly to its destination via path3, we reroute the packet to the Redirector for the Internal interface, node C. We call this a Session Announcement. We change the destination MAC in the packet so that it will travel via path6 to Node C.

The Redirector on Node C sees the packet. It does not have a session for the traffic, so it creates a new redirector session. It observes that the source MAC address on the packet is that of Node B, and therefore knows that this is a Session Announcement. It therefore sets the session node choice to Node B. The packet is then sent back out the same Internal interface toward the next hop router via path5.

The return traffic for the session will arrive from the Internal network via path5 to the Redirector at Node C. The Redirector finds a session for the traffic and redirects it to Node B via path6.

The Load Director on Node B sees the packet but does not have a session for it. Since it is not the Redirector, it creates a marker session for the traffic. It knows that this is an inbound packet and that it is not the Redirector, so it concludes that the Redirector (on node C) must have a session for it. Therefore, it will no longer be necessary to send Session Announcements for this network stream to the Redirector. The presence of the marker session will prevent Session Announcements for future packets outbound on the Internal side. The traffic passes on up into Node B for processing.

When the traffic reaches the External side of Node B, it will match the first marker session created above. This marker session indicates that the Redirector for the External Interface already has a session for this traffic. Therefore, a Session Announcement is not necessary, and the traffic will continue to its destination via path4.

At this point, two redirector sessions and two marker sessions have been established for the traffic. Traffic from the External to the Internal networks will pass via path1->path2->path3, and traffic from the Internal to the External networks will pass via path5->path6->path4.

We have described a system and method for propagating sessions across a plurality of load sharing network devices in which we ensure that all redirectors choose the same node for maintaining the network stream. This is accomplished by establishment of Session Announcement mechanism that makes use of an outgoing packet, and the data it already contains, to propagate the need for a session to a redirector node.

The Session Announcement makes use of an outgoing packet to propagate the need for a session to a redirector node by modifying the MAC address of the first packet in a network stream. The packet contains all the information that the redirector needs to create a session. Passing the packet through the redirector ensures that the needed redirector session will be created before the associated packet reaches its destination network.

The advantages of this approach are numerous. The Session Announcement solution inherently keeps the load of session announcing in line with the traffic load of the cluster node, such that the announcement facility cannot be overrun by heavy load. In addition, the method eliminates race conditions by ensuring that return traffic cannot reach the redirector node before the notification that a new redirector session is needed.

Before Session Announcement, sessions had to be propagated to the Redirector nodes using a complex protocol that involved keeping a history of sessions propagated in the event that they needed to be retransmitted, and acknowledging what state had been transmitted, much like TCP. The overhead of such a protocol is prohibitively expensive. With Session Announcement, there is no need for a reliable protocol to ensure retransmission in the event of packet loss. The complexity of storing, aging, and cleaning up copies of previously propagated session state (in the event that it needs to be retransmitted) is avoided.

In the above discussion, the term "computer" is defined to include any digital processing unit. Examples include any network appliance, personal computer, workstation, mainframe, server, or supercomputer capable of embodying the inventions described herein.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a cluster having two or more nodes and a first and a second interface, wherein each node is connected to the first and second interfaces, wherein exactly one node includes a first redirector, wherein exactly one node includes a second redirector, wherein a network stream consists of a series of associated packets, wherein exactly one node is chosen to handle the network stream, wherein sessions are used to keep all packets for a network stream on the same node, wherein the chosen node is a different node from the node that includes the first redirector, and wherein the chosen node is a different node from the node that includes the second redirector, a method of propagating sessions, comprising:
receiving a first packet at the first interface on the node that includes the first redirector;
establishing, within the first redirector, a redirector session;
forwarding the first packet from the first redirector to the chosen node;
receiving the first packet at the chosen node, wherein receiving includes creating a marker session corresponding to the network stream;
passing the first packet through the chosen node;
sending a Session Announcement from the chosen node to the second redirector;
creating a second redirector session as a result of the Session Announcement on the second redirector;
sending the first packet out through the second interface;
receiving a return packet associated with the network stream at the second interface on the node including the second redirector;
determining that the return packet belongs to the chosen node based on the second redirector session;
routing the return packet from the second redirector to the chosen node; and
routing the return packet through the chosen node and out through the first interface.

2. The method of claim 1, wherein routing the return packet from the second redirector to the chosen node includes creating a marker session in the chosen node corresponding to the network stream associated with the return packet.

3. The method of claim 1, wherein sending a Session Announcement includes sending a modified version of the first packet from the chosen node to the second redirector.

4. An article comprising a non-transitory computer readable storage medium storing instructions thereon, wherein the instructions, when executed in a computer, create a system for executing the method of claim 1.

5. A cluster, comprising:
a first and a second interface; and
two or more nodes, wherein each node is connected to the first and second interfaces, wherein a first node includes a first redirector and wherein a different node includes a second redirector;
wherein the first and second redirectors include means for establishing and tracking sessions and means for forwarding packets to a chosen node, wherein the chosen node is a different node than either the nodes that include the first or second redirectors, wherein the first redirector is configured to establish a redirector session based on receiving a packet at the first interface, wherein the chosen node receives the packet from the first redirector and uses the packet to send a Session Announcement to the second redirector and wherein the second redirector is configured to create a new redirector session as a result of the Session Announcement received from the chosen node.

6. The cluster of claim 5, wherein the Session Announcement is a modified version of the packet.

7. The method of claim 1, wherein the node that includes the second redirector is different from the node that includes the first redirector.

8. A cluster, comprising:
a first and a second interface; and
three or more nodes, wherein at least one of the nodes is connected to the first and second interfaces, wherein a first node includes a first redirector and wherein a different node includes a second redirector and wherein one node is chosen to handle a network stream between the first redirector and the second redirector, wherein the node that includes the first redirector, the node that includes the second redirector, and the chosen node are different from one another, wherein the first and second redirectors are configured to establish and track sessions and forward packets to the chosen node, wherein the first redirector is configured to establish a redirector session based on receiving a packet at the first interface, wherein the chosen node is configured to receive the packet from the first redirector and send a Session Announcement to the second redirector using the packet and wherein the second redirector is configured to create a new redirector session as a result of the Session Announcement received from the chosen node.

9. The apparatus of claim 8, wherein the second redirector is configured to determine whether a return packet received from outside the cluster belongs to the chosen node based on the session created by the second redirector in response to receipt of the Session Announcement from the chosen node.

10. The apparatus of claim 9, wherein the second redirector is configured to route the return packet to the chosen node upon determination that the return packet belongs to the chosen node.

11. A system, comprising:
at least one server; and
a cluster operatively coupled to the at least one server, wherein the cluster comprises:
a first and a second interface; and
three or more nodes, wherein at least one of the nodes is connected to the first and second interfaces, wherein a first node includes a first redirector and wherein a different node includes a second redirector and wherein one node is chosen to handle a network stream between the first redirector and the second redirector, wherein the node that includes the first redirector, the node that includes the second redirector, and the chosen node are different from one another, wherein the first and second redirectors are configured to establish and track sessions and forward packets to the chosen node, wherein the first redirector is configured to establish a redirector session based on receiving a packet at the first interface, wherein the chosen node is configured to receive the packet from the first redirector and send a Session Announcement to the second redirector using the packet and wherein the second redirector is configured to create a new redirector session as a result of the Session Announcement received from the chosen node;

wherein the at least one server is configured to receive the packet via the second redirector and send a return packet to the second redirector.

12. The system of claim 11, wherein the second redirector is configured to determine whether the return packet received from the at least one server belongs to the chosen node based on the session created by the second redirector in response to receipt of the Session Announcement from the chosen node.

13. The system of claim 12, wherein the second redirector is configured to route the return packet to the chosen node upon determination that the return packet belongs to the chosen node.

14. In a cluster having two or more nodes and a first and a second interface, wherein each node is connected to the first and second interfaces, wherein exactly one node includes a first redirector, wherein exactly one node includes a second redirector, wherein a network stream consists of a series of associated packets, wherein exactly one node is chosen to handle the network stream, wherein sessions are used to keep all packets for a network stream on the same node, wherein the chosen node is a different node from the node that includes the first redirector, and wherein the chosen node is a different node from the node that includes the second redirector, an apparatus of propagating sessions, comprising:

means for receiving a first packet at the first interface on the node that includes the first redirector;

means for establishing, within the first redirector, a redirector session;

means for forwarding the first packet from the first redirector to the chosen node;

means for receiving the first packet at the chosen node, wherein receiving includes creating a marker session corresponding to the network stream;

means for passing the first packet through the chosen node;

means for sending a Session Announcement from the chosen node to the second redirector;

means for creating a second redirector session as a result of the Session Announcement on the second redirector;

means for sending the first packet out through the second interface;

means for receiving a return packet associated with the network stream at the second interface on the node including the second redirector;

means for determining that the return packet belongs to the chosen node based on the second redirector session;

means for routing the return packet from the second redirector to the chosen node; and means for routing the return packet through the chosen node and out through the first interface.

* * * * *